United States Patent [19]
Rao et al.

[11] Patent Number: 5,919,866
[45] Date of Patent: Jul. 6, 1999

[54] LIQUID TONERS WITH HYDROCARBON SOLVENTS

[75] Inventors: Prabhakara S. Rao, Maplewood; Valdis Mikelsons, Mendota Heights, both of Minn.

[73] Assignee: Minnesota Mining and Manufacturing Company, St. Paul, Minn.

[21] Appl. No.: 09/020,601

[22] Filed: Feb. 9, 1998

Related U.S. Application Data

[62] Division of application No. 08/739,977, Oct. 30, 1996, Pat. No. 5,753,763, which is a division of application No. 08/390,692, Feb. 17, 1995, Pat. No. 5,604,070.

[51] Int. Cl.[6] .................................................. C08F 259/00
[52] U.S. Cl. ........................ 525/276; 525/279; 525/288; 525/260; 525/263; 525/268; 525/269; 525/270; 430/109; 430/110; 430/114; 430/115; 430/137
[58] Field of Search .................................... 525/276, 288, 525/279, 260, 263, 269, 268, 270; 430/110, 109, 114, 115, 137

[56] References Cited

U.S. PATENT DOCUMENTS

| | | |
|---|---|---|
| 2,297,691 | 10/1942 | Carlson . |
| 2,752,833 | 7/1956 | Jacob . |
| 2,986,466 | 5/1961 | Kaprelian . |
| 3,344,098 | 9/1967 | Horiguchi et al. . |
| 3,553,133 | 1/1971 | Olson . |
| 3,690,756 | 9/1972 | Smith . |
| 3,743,503 | 7/1973 | Goldman . |
| 3,753,760 | 8/1973 | Kosel . |
| 3,900,412 | 8/1975 | Kosel . |
| 3,991,226 | 11/1976 | Kosel . |
| 4,033,890 | 7/1977 | Tamai et al. . |
| 4,268,598 | 5/1981 | Leseman et al. . |
| 4,321,404 | 3/1982 | Williams et al. . |
| 4,370,047 | 1/1983 | Damouth et al. . |
| 4,403,848 | 9/1983 | Snelling . |
| 4,467,334 | 8/1984 | Anzai . |
| 4,564,574 | 1/1986 | Uytterhoeven et al. . |
| 4,614,521 | 9/1986 | Niwa et al. . |
| 4,619,990 | 10/1986 | Elmasry . |
| 4,728,983 | 3/1988 | Zwadlo et al. . |
| 4,774,035 | 9/1988 | Carmelite et al. . |
| 4,778,742 | 10/1988 | Ong et al. . |
| 4,795,794 | 1/1989 | Winnik et al. . |
| 4,909,806 | 3/1990 | Garbe . |
| 4,925,766 | 5/1990 | Elmasry et al. . |
| 4,978,598 | 12/1990 | Elmasry et al. . |
| 4,988,602 | 1/1991 | Jongewaard et al. . |
| 5,030,701 | 7/1991 | Garbe . |
| 5,061,587 | 10/1991 | Tsubuko et al. . |
| 5,063,132 | 11/1991 | Pierce et al. . |
| 5,066,559 | 11/1991 | Elmasry et al. . |
| 5,147,750 | 9/1992 | Nakanishi ............................... 430/110 |
| 5,166,326 | 11/1992 | Smith et al. . |
| 5,188,641 | 2/1993 | Parton . |
| 5,283,148 | 2/1994 | Rao . |
| 5,302,482 | 4/1994 | Elmasry et al. . |
| 5,344,694 | 9/1994 | Horie et al. ............................ 430/115 |
| 5,604,070 | 2/1997 | Rao et al. ............................... 430/110 |
| 5,753,763 | 5/1998 | Rao et al. ............................... 525/276 |

FOREIGN PATENT DOCUMENTS

| | | |
|---|---|---|
| 0683436 | 11/1995 | European Pat. Off. . |
| 0706095 | 4/1996 | European Pat. Off. . |
| 59-050449 | 3/1984 | Japan . |
| 59-217714 | 12/1984 | Japan . |
| 63-314285 | 12/1988 | Japan . |
| 6902194 | 8/1969 | Netherlands . |
| 1167161 | 10/1969 | United Kingdom . |
| 1181287 | 2/1970 | United Kingdom . |
| 1220450 | 1/1971 | United Kingdom . |
| 1314423 | 4/1973 | United Kingdom . |
| 1377067 | 12/1974 | United Kingdom . |

OTHER PUBLICATIONS

Schmidt, S.P., Larson, J.R., Bhattacharya, R. in *Handbook of Imaging Materials*, Diamond, A.S., Ed., Marcel Dekker, New York, 1991, pp. 227–252.

Lehmbeck, D.R. in *Neblette's Handbook of Photography and Reprography*, Sturge, J., Ed., Van Nostrand Reinhold, New York, 1977, Ch. 13, pp. 331–387.

Ito et al., *Macromolecules* 1982, 915–20.

Ito et al., *Macromolecules* 1984, 17, 2204–5.

R.S. Asquith, H.S. Blair, A.A. Crangle, E. Riordan "Self--colored Polymers Based on Anthraquinones", Journal of the Society of Dyers and Colourists; Apr., 1977; pp. 114–125.

Lord, M.W.; Peters, A.T.; *J. Chem. Soc.*, Perkins Trans., 1,(20)2305–8.

Matsumoto, S.; Kubodera, K.; Kaino, T. *Appl. Phys. Lett.* 51,1,(1987).

Chem. Abstracts, vol. 102, No. 26 (Jul. 1, 1985), Abstract No. 221655u, p. 36 of Japanese Patent 59–217714.

*Polymer Handbook* $2^{nd}$ Edition, J. Brandrup et al. Ed., Wiley–Interscience Publication (1975) pp. IV–337 to IV–348.

Bonardi et al., Makromolekulare Chemie, Macromolecular Chemistry and Physics, vol. 186, No. 2, Feb. 1985, pp. 261–271.

CAS Registry; RN 2638–94–0.

*Primary Examiner*—Melvyn I. Marquis
*Attorney, Agent, or Firm*—Gary L. Griswold; John H. Hornickel

[57] ABSTRACT

The toner particles of this invention comprise pigment and a resin. The resin comprises a novel polymer formed from ethylenically unsaturated monomers, macromeric moieties that render the resin dispersible in hydrocarbon solvents, and a surface-release promoting moiety. When used for toner particles the polymer further comprises charge directing chelating moieties. The toner particles also include a charge director, preferably a metal cation. The toner particles, when dispersed in a carrier liquid, are useful as liquid toners for electrographic or electrophotographic processes.

9 Claims, No Drawings

LIQUID TONERS WITH HYDROCARBON SOLVENTS

This is a division of application Ser. No. 08/739,977 filed Oct. 30, 1996, U.S. Pat. No. 5,753,763, which is a division of application Ser. No. 08/390,692, filed Feb. 17, 1995, now U.S. Pat. No. 5,604,070.

BACKGROUND OF THE INVENTION

1. Field of the Invention

This invention relates to liquid toners that are useful for electrographic and electrophotographic processes.

2. Discussion of the Art

In electrography and electrophotography a toner is deposited on a charged surface, typically an imagewise charged surface. Electrography generally comprises placing a charge onto selected areas of a dielectric medium with an electrostatic writing stylus or its equivalent to form a charge image, applying toner to the charge image, and fixing the toned image.

Electrophotography forms the technical basis for various well known imaging processes, including photocopying and laser printing. A general discussion of color electrophotography is presented in "Electrophotography," by R. M. Schaffert, Focal Press, London & New York, 1975, pp. 178–190. The basic electrophotographic process involves placing a uniform electrostatic charge on a photoreceptor element, imagewise exposing the photoreceptor element to light thereby dissipating the charge in the exposed areas, developing the resulting electrostatic latent image with a toner, and transferring the toner image from the photoreceptor element to a final substrate, such as paper, either by direct transfer or via an intermediate transfer material. Since the toner image has to undergo at least one and usually two transfers, it would be highly desirable to develop a toner which displays good differential adhesion, i.e. releases well from the photoreceptor element and adheres strongly to the final receptor.

Liquid toners are well known in the imaging arts. See, for example, Schmidt, S. P.; Larson, J. R.; Bhattacharya, R. in *Handbook of Imaging Materials*, Diamond, A. S., Ed.: Marcel Dekker, New York, 1991, pp. 227–252 or Lehmbeck, D. R. in *Neblette's Handbook of Photography and Reprography*, Sturge, J., Ed.: Van Nostrand Reinhold, New York, 1977, Chapter 13, pp. 331–387. A liquid toner is a dispersion of colloidal size particles, hereinafter referred to as "toner particles", in a carrier liquid (or dispersing medium) which has a low dielectric constant. The toner particles comprise a colorant and a film-forming resin and carry an electrostatic charge. The toner particles in the dispersion are capable of migrating under the influence of an electric field and being deposited on a surface bearing an opposite charge, thereby forming an image.

Typically, the carrier liquid is a hydrocarbon that has a low dielectric constant (e.g., less than 3) and a vapor pressure sufficiently high to ensure rapid evaporation of solvent following deposition of (the toner onto a photoreceptor, transfer belt, and/or receptor sheet. Rapid evaporation is particularly important for cases in which multiple colors are sequentially deposited and/or transferred to form a single image. An example of such a carrier liquid is the ISOPAR™ family of solvents (boiling point range: 130–160° C.).

Both dyes and pigments have been used as the colorant in toner particles. The primary advantages of dyes are their bright colors and transparency. One of the advantages of pigments is that color migration, or "bleeding", is minimized at the fusion step. Another advantage of pigments as colorants for toners is the durability of the color and high optical densities of the image.

In addition to the colorant, the toner particles include a resin. The resin stabilizes the dispersion of the toner particles in the carrier liquid by means of the solvated floating chains of the resin as well as by electrostatic charges which could be imparted to the resin either by metal ion complexation or the chemical structure of the resin. The resin assists in film formation of toner deposited on a receptor by the coalescence of the toner particles and the fixing of the pigment particles. In addition, a resin which provides the toner film with differential adhesion properties with respect to the substrate surfaces is usually desired. Finally, the glass transition temperature ($T_g$) and the morphology of the resin control other toner film properties such as scratch resistance and overprintability of different colors.

Use of organosols as all or part of the resin component of the toner particles is known. Organosols usually comprise a thermoplastic resinous portion, which is not highly soluble in the carrier liquid, chemically anchored to steric stabilizing polymers or copolymers which are soluble in the carrier liquid. When dispersed in the carrier liquid, the solubility differences of these two portions of the organosol cause it to have a core-shell or "micelle" type of structure, where the substantially insoluble thermoplastic resin forms a "core" which is surrounded by the "shell" of soluble polymer or copolymers. When the carrier liquid evaporates, either the core or shell properties can dominate the physical properties of the resulting film.

Toner particles are typically made by a process having the steps of polymerizing the resin or binder (this step typically occurs in a solvent), milling the resin with pigment particles, drying the milled mixture, grinding the dried mixture to form colloidal sized particles and suspending the particles which are a composite of pigment and resin in the dispersing liquid.

SUMMARY OF THE INVENTION

This invention provides novel toner particles that display excellent differential adhesion. They adhere strongly to cellulosic substrates but release well from photoreceptor elements. This excellent differential adhesion is attained by the incorporation of a surface-release promoting agent into the resin. These toner particles have the additional advantage that they are produced using a resin which may be polymerized directly in the carrier liquid to form a dispersion of resin particles in the carrier liquid. The resin dispersion can then be directly blended in the pigment and milled in the solvent phase, they avoiding the drying step.

The toner particles of this invention comprise pigment and a resin. The resin comprises a novel polymer formed from ethylenically unsaturated monomers, macromeric moieties that render the resin dispersible in hydrocarbon solvents, and a surface-release promoting moiety. When used for toner particles the polymer further comprises charge directing chelating moieties. The toner particles also include a charge director, preferably a metal cation which is chelated by the chelating moieties. The toner particles of this invention may be dispersed in a carrier liquid to form a liquid toner.

The polymer portions formed from the ethylenically unsaturated monomers are not substantially soluble in most liquid toner carrier liquids and therefore form a "core"

surrounded by a "shell" of the macromeric moieties when the toner particles or resin is dispersed in a hydrocarbon carrier liquid. The surface-release promoting moieties and the charge directing chelating moieties may be found in either the core or the shell, but are preferably located in the shell. In other words, the surface-release promoting moieties and the charge directing bidentate chelating moieties may be grafted to the acrylic polymer but are preferably grafted onto the macromeric moieties.

The surface-release promoting moiety preferably is derived from a free radically polymerizable monomer having silicon or fluorine atoms. The charge-directing chelating moiety can be a bidentate or polydentate chelating moiety that can be incorporated into the resin for the purpose of binding a metal cation, which can function as a charge-directing agent. A chelating moiety capable of forming a 5- or 6-membered ring around a coordinated metal center is preferred. The macromeric moieties are derived from one or more monomers that will form polymers that are soluble in hydrocarbon solvents. Since the surface release promoting moiety and the charge chelating moiety are preferably located in the shell of the resin, the macromer may be formed by combining one or more monomers that will form polymers that are soluble in hydrocarbon solvents with silicone-containing or fluorine-containing monomers that promote release of a polymeric film from the surface of a substrate and/or charge-directing chelating monomers, and, optionally, monomers, which preferably have pendent hydroxy (—OH) groups.

This invention further provides a process for preparing liquid toners comprising the inventive toner particles. The process comprises steps of:

(1) combining in a hydrocarbon solvent (a) at least one monomer capable of free radical polymerization and (b) at least one macromer that is dispersible in said hydrocarbon solvent to form a mixture, (2) free radically polymerizing the polymerizable components of the mixture formed in step (1) in the presence of a metal cation to form a stable dispersion, and (3) milling the mixture formed in step (2) with pigment particles to disperse the pigment into the polymer.

Either the macromer contains the charge-directing chelating moieties and surface-release promoting moieties or these components can be added to the mixture of step (1) and incorporated into the resin during free radical polymerization.

This invention also provides a method of forming an image comprising the steps of:

a) providing a dielectric medium having at least one region of electrostatic charge (e.g., an imagewise distribution of charge) on the surface thereof, b) intimately contacting the dielectric medium with a liquid toner comprising a hydrocarbon carrier liquid and the inventive toner particles, thereby depositing said toner particles in a pattern corresponding to the surface charge on the dielectric medium, and c) optionally transferring the deposited polymeric toner to a receptor.

DETAILED DESCRIPTION OF THE INVENTION

The toner particles of this invention comprise a pigment, a polymeric resin, and a charge directing agent. The polymeric resin comprises a portion which is formed from ethylenically unsaturated free radically polymerizable monomers. This portion forms a core which is substantially insoluble in liquid toner carrier liquids. The polymers which are formed from these monomers and which comprise the core of the resin preferably have a Tg in the range of from about −24 to about 65° C. The predominately hydrocarbon-based free radically polymerizable monomers that comprise the core of the polymers are selected from the group consisting of acrylates, methacrylates, and styrenics. The preferred monomers are ethyl acrylate, ethyl methacrylate, butyl methacrylate, styrene, and 3,4-methyl styrene.

The polymeric resin also comprises macromeric portions which are grafted to the core polymer. These macromers are copolymerizable with the core monomers because of the presence of an ethylenically unsaturated group at one end of the macromer. These macromeric portions are substantially soluble in liquid toner carrier liquid and stabilize dispersions of the polymer or of the toner particles in the carrier liquid by forming a shell around the core when the particles are dispersed in the liquid toner carrier liquid. The macromers of this invention preferably have molecular weights of from about 10,000 to about 300,000, more preferably greater than about 50,000, and most preferably greater than about 100,000.

The polymeric resin further comprises charge directing chelating moieties. The charge directing chelating moiety chelates with a metal cation to provide a charge to the toner. The charge-directing chelating moiety can be a bidentate or polydentate chelating moiety that can be incorporated into the resin for the purpose of binding a metal cation, which can function as a charge-directing agent. A chelating moiety capable of forming a 5- or 6-membered ring around a coordinated metal center is preferred. Examples of suitable charge directing chelating monomers include 4-vinyl pyridine, 4-vinyl-4'-methyl bipyridine, acetoacetoxyalkyl acrylates such as acetoacetoxyethyl acrylate, acetoacetoxy-alkyl methacrylates such as acetoacetoxyethyl methacrylate, alternatively named 2-(methacryloxy)ethyl acetoacetate, and 5-methacryloxymethyl-8-hydroxyquinoline. Preferably, the charge directing chelating monomer is acetoacetoxyethyl methacrylate.

Finally, desired differential adhesion of the toner particles is provided by the inclusion of a surface release promoting moiety in the polymeric resin. The surface release promoting moiety is derived from a free radically polymerizable monomer having silicon or fluorine atoms. Preferred monomers contain at least two silicon atoms or at least two fluorine atoms in a monomer. Examples of suitable free radically polymerizable monomers having silicon atoms include but are not limited to trialkyl(aryl)silylmethacrylates such as trimethylsilylmethacrylate or (phenyldimethylsilyl)methyl methacrylate, 3-methacryloxypropylbis(trimethylsiloxy) methylsilane, 3-methacryloxypropylpentamethyldisiloxane, tri(trimethylsiloxy)-3-methacryloxypropylsilane, also, named as 3-methacryloxypropyltris(trimethylsiloxy)silane, (trialkyl(aryl)silylmethyl)methacrylate such as trimethylsilylmethyl methacrylate, methacryloxypropyltris (methoxyethoxy)silane, (phenyldimethylsilyl) methylmethacrylate, 2-(trimethylsiloxy) ethylmethacrylate, trialkyl(aryl)silylacrylates, tris (trimethylsiloxy)-3-acryloxypropylsilane, also, named 3-acryloxypropyltris(trimethylsiloxy)silane, 3-acryloxypropylmethylbis(trimethylsiloxy)silane, 3-acryloxypropyldimethyl(trimethylsiloxy)silane, 3-acryloxypropyldimethylmethoxysilane, 3-acryloxypropylmethyldimethoxysilane, 3-acryloxypropyltrimethoxysilane, vinyl pentamethyl disiloxane, vinyl triacetoxysilane, vinyltris(trimethylsiloxy) silane, tris[tris(trimethylsiloxy)siloxy]vinylsilane, 2-propenyltrimethylsilane, 3-acryloxypropylpentamethyldisiloxane, allyltrimethylsilane, and allyltris(trimethylsiloxy)silane. Especially preferred monomers silicon containing monomers are 3-methacryloxypropyltris(trimethlylsiloxy)silane, 3-acryloxypropyltris(trimethylsiloxy)silane, vinyltris (trimethylsiloxy)silane, and tris[tris(trimethylsiloxy)siloxy] vinylsilane.

Non-limiting examples of highly fluorinated free radically polymerizable monomers include: fluorinated alkenes such as pentafluorostyrene, octafluorostryene, perfluoro-1,4-pentadiene, perfluoro-1,6-heptadiene, 3,5-bis (trifluoromethyl) styrenes, etc.; fluorinated acrylates and methacrylates such as 2,2,3,3,4,4,5,5,6,6,7,7,8,8,8-pentadecafluorooctyl acrylate, 2,2,3,3,4,4,5,5,6,6,7,7,8,8,8-pentadecafluorooctyl methacrylate, 2,2,3,3,4,4,5,5,6,6,7,7,8,8,9,9,10,10,10-nonadecafluorodecyl methacrylate, 1,2,2,3,3,4,4,5,5,6,6-undecafluorocyclohexylmethyl acrylate, 1,2,2,3,3,4,4,5,5,6,6-undecafluorocyclohexylmetlhyl methacrylate, 1,2,2,3,3,4,4,5,5,6,6-decafluoro-4-trifluoromethylcyclohexylmethyl acrylate, perfluorohexyl acrylate, perfluorobutyl acrylate, perfluorodecyl acrylate, 2,2,2-trifluoroethyl acrylate, 2,2,2-trifluoroetlhyl methacrylate, 1,1,1,3,3,3-hexafluoro-2-propyl acrylate, $C_8F_{17}SO_2N(n$—$C_4H_9)CH_2CH_2O_2CCH=CH_2$, etc.; trifluorinated alkyl acrylonitriles, e.g., trifluoromethyl acrylonitrile; perfluoroalkyl vinyl ethers such as perfluorobutyl vinyl ether, pentafluoroethyl vinyl ether, etc.; or any other highly fluorinated monomers. The most preferred monomers include perfluorooctyl ether acrylate, perfluorooctyl acrylate, and perfluorooctyl methacrylate.

The charge directing chelating moieties and the surface release promoting moieties may be found in either or both of the core or the shell of the polymeric resin. However, these moieties are preferably grafted to the macromer and found in the shell.

The structure of a preferred macromer is shown below:

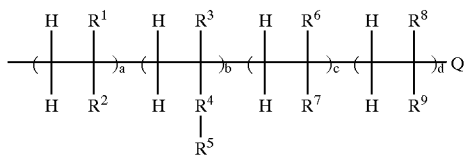

wherein $R^1$ represents hydrogen or an alkyl group having 1, 2, 3, or 4 carbon atoms;

$R^2$ represents a member selected from the group consisting of $C(O)OR^{10}$, $OR^{10}$, and $R^{10}$, wherein $R^{10}$ represents a linear, branched, or cyclic hydrocarbyl group selected from alkyl, alkaryl, and aralkyl groups having from 8 to 32 carbon atoms, inclusive;

$R^3$ represents hydrogen or an alkyl group having 1, 2, 3, or 4 carbon atoms;

$R^4$ represents a divalent linking group selected from the group consisting of oxy, thio, alkylene, arylene, aralkylene, alkarylene, and carboxy groups, and chemically stable combinations of the foregoing groups (e.g., no peroxidic linkages);

$R^5$ represents a radical moiety derived by removing a hydrogen atom from one of the following bidendate ligands: 8-hydroxyquinolinine or substituted derivative thereof, 2,2'-bipyridine or substituted derivative thereof, 1,10-phenanthroline or substituted derivative thereof, beta-diketones. Examples of beta-diketone radicals are shown below.

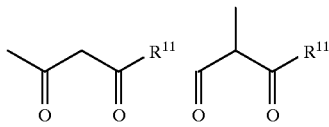

where $R^{11}$ represents a member selected from the group consisting of hydrogen, alkyl, aryl, aralkyl, and alkaryl groups;

$R^6$ represents hydrogen or an alkyl group having 1, 2, 3, or 4 carbon atoms;

$R^7$ represents a member selected from the group consisting of $C(O)OSi(R^{12})_3$, $C(O)O(CH_2)_nSi(R^{12})_3$, $(CH_2)_nSi(R^{12})_3,O(CH_2)_nSi(R^{12})_3$, where $R^{12}$ represents a member selected from the group consisting of alkyl, aryl, alkoxyl, trialkylsiloxy, and triarylsiloxy groups and combinations of the foregoing groups, and n represents an integer from 1 to 12, inclusive, $CH_2R_f$, $C(O)OR_f$, $OR_f$, where $R_f$ represents a fluorinated, preferably perfluorinated, group selected from the group consisting of alkyl, aryl, alkaryl, and aralkyl groups having up to 18 carbon atoms;

$R^8$ represents a member selected from the group consisting of hydrogen or alkyl group having from 1 to 4 carbon atoms, wherein Q represents a member selected from the group having the structural formula:

$$—\{X—R^{13}—(Y)_e\}$$

wherein $R^{13}$ represents a divalent or polyvalent linking group selected from the group consisting of alkylene, arylene, alkarylene, and aralkylene groups, X represents divalent sulfur, methylene, ethylene, or a substituted methylene group —$(CR^{14}R^{15})$, wherein $R^{14}$ and $R^{15}$ independently represent hydrogen, alkyl, aryl, cyano, or oxyalkyl group, Y represents a member selected from the group consisting of acryloxy, alkacryloxy, —$OC(O)NH(R^{14})NHC(O)C(R^{16})=CH_2$, and —$O(R^{14})C(R^{17})=CH_2$, where $R^{16}$ and $R^{17}$ independently represent hydrogen or an alkyl group having from 1 to 12 carbon atoms, inclusive, and e represents the valence of $R^{13}$ minus one;

$R^9$ represents a member selected from the group consisting of hydrogen, alkyl, aryl, alkaryl, aralkyl, $C(O)OR^{18}$, and $OR^{10}$ groups, where $R^{18}$ represents a member selected from the group consisting of alkyl groups containing 1 to 7 carbon atoms, aryl groups, aralkyl groups wherein at least 50% of the carbon atoms are aromatic, alkaryl groups wherein 50% of the carbon atoms are aromatic, or alkyl derivatives where one to three of the hydrogen atoms on the alkyl group are replaced by a hydroxy, methacryloxy, acryloxy, or vinyl group.

If $R^{13}$ is divalent then the value of e is 1; if $R^{13}$ is trivalent, then the value of e is 2, and so forth. Preferably, the value of e ranges from 1 to 10, more preferably the value of e is 1 or 2. Most preferably, the value of e is 1.

The values for a, b, c, and d represent the weight fraction of the respective monomeric units; the sum of a+b+c+d=1. The range for a is 0.5 to 1.0; the preferred range for a is 0.8 to 1.0. The range for b is 0.0 to 0.2; the preferred range for b is 0.05 to 0.10. The range for c is 0.0 to 0.1; the preferred range for c is 0.0 to 0.05. The range for d is 0.0 to 0.5; the preferred range for d is 0.0 to 0.10.

The polymeric resin comprising the core and shell may be formed by combining the ethylenically unsaturated monomers with the macromer and free radically polymerizing those components. Preferably, the macromer of this invention is formed by: (1) heating a mixture comprising a monomer (A) the polymer of which is soluble in a hydrocarbon solvent, preferably a charge-directing bidendate chelating monomer (B) and a surface release-promoting silicone-containing or a fluorine-containing monomer (C), and an optional monomer (D)) in the presence of a chain transfer agent and a free radical generating initiator, provided that at least one of monomer (D), the chain transfer agent, or the initiator has pendent hydroxy (—OH) groups and (2) reacting at least some of the pendent hydroxy groups with a coupling agent containing a free radically polymerizable group. However, the macromer can be made by other processes. If the charge-directing chelating monomer (B) and silicon or fluorine containing monomers (C) are not incorporated into the macromer or additional chelating moieties or silicon or fluorine containing moieties are desired, such moieties may be incorporated into the resin by the inclusion of suitable monomers with the ethylenically unsaturated monomer and the macromer before free radically polymerizing the core portion with the macromer.

Examples of monomers (A) include lauryl methacrylate, lauryl acrylate, iso-bornyl methacrylate, iso-octyl acrylate, iso-decyl acrylate, n-decyl acrylate, n-decyl methacrylate, n-octadecyl acrylate, and n-octadecyl methacrylate. Combinations of the above-mentioned monomers can also be used. Monomer (A) serves to render the macromer soluble in the solvent wherein polymerization is conducted. Polymers resulting from the homopolymerization of monomer (A) are substantially soluble in the polymerization solvent. Preferred monomers (A) are lauryl methacrylate, lauryl acrylate, iso-bornyl methacrylate, iso-bornyl acrylate, and iso-octyl acrylate.

Examples of monomers (B) are set forth above. Monomer (B) chelates with a metal cation to provide a charge to the toner. Monomer (B) is required to be at least bidentate, i.e., at least two ligating groups must be present in close enough proximity such that they can simultaneously bind to a metal center. Monomer (B) preferably provides a moiety capable of forming a 5- or 6-membered ring about a coordinated metal center.

Examples of monomers (C) comprising silicon or fluorine atoms are set forth above.

Examples of monomers (D) include styrene, p-chlorostyrene, methylstyrenes, vinyl ethers or halogenated vinyl esters and halogenated vinyl esters including vinyl acetate, alkylacrylates and alkylmethacrylates, such as methylmethacrylate, ethyl acrylate, n-butylacrylate, isobutylacrylate, phenylacrylate, methylacrylate, ethylmethacrylate, n-butylmethacrylate, hydoxyethylmethacrylate, hydroxypropylmethacrylate, glycidylmethacrylates, vinyl azlactones, vinyl oxazolines, and the like.

Examples of suitable chain transfer agents for providing a polymer having a hydroxy group include mercaptoalcohols, such as 3-mercapto-1,2-propanediol, 2-mercaptoethanol, 3-mercapto-2-butanol, 1-mercapto-2-propanol, 2-mercapto-3-pyridonol, mercaptophenol, bromoalcohols such as bromoethanol. Another class of chain transfer agents that are useful for preparing a polymer having a free carboxylic acid group include mercaptocarboxylic acids, such as mercaptoacetic acid, and halogenated aliphatic carboxylic acids.

Examples of coupling agents containing a free radically polymerizable group that are suitable for this invention include acryloyl halides (e.g., acryloyl chloride), methacryloyl halides (e.g., methacryloyl chloride), isocyanatoalkyl methacrylate (e.g., isocyanatoethyl methacrylate), and glycidylmethacrylates. Examples of coupling agents containing a free radically polymerizable group include glycidylmethacrylates.

Free radical initiators suitable for this invention include 2,2'-azobis(2-methylpropionitrile), 4,4'-azobis(4-cyanopentoic acid), 2,2'-azobis{2-methyl-N-1,1 -bis(hydroxyethyl)propionamide}, 2,2'-azobis{2-methyl-N-[1, 1-bis(hydroxymethylethyl)]propionamide}, and 2,2'-azobis{2-methyl-N-(2-hydroxyethyl) propionamide}. Preferred initiators contain a free hydroxy group.

In addition to the polymeric resin, the toner particles of this invention comprise pigments and charge directors. Charge directors suitable for this invention are polyvalent metal ions. The charge director can be introduced in the form of a metal salt. Preferred metal salts comprise metal ions and organic anions as the counterion. Preferred metal ions are Ba(II), Ca(II), Mn(II), Zn(II), Zr(IV), Cu(II), Al(III), Cr(III), Fe(II), Fe(III), Sb(III), Bi(III), Co(II), La(III), Pb(II), Mg(II), Mo(III), Ni(II), Ag(I), Sr(II), Sn(IV), V(V), Y(III), and Ti(IV). A preferred metal ion is zirconium(IV). Preferred organic anions are carboxylates or sulfonates derived from aliphatic or aromatic carboxylic or sulfonic acids, preferably aliphatic fatty acids such as stearic acid, behenic acid, neodecanoic acid, diisopropylsalicylic acid, octanoic acid, abietic acid, naphthenic acid, octanoic acid, lauric acid, tallic acid, and the like. Barium Petronate™ (Witco Chemical Corporation, Sonneborn Division, NY) is a useful source of barium ion for the practice of this invention.

Any pigments known in the art for use in toners may be used in the toner particles of this invention. Such pigments include but are not limited to phthalocyanines, such as copper phthalocyanine; carbon black; nigrosine dye; Aniline Blue; Chrome Yellow; Dupont Oil Red (from DuPont); Monoline Yellow; Sunfast Blue, Sun Yellow, Sun Red and other pigments available from Sun Chemical Co.; Harmon Quindo Red; Regal 300; Fluorol Yellow 088, Fluorol Green Gold 084, Lumogen Yellow S 0790, Ultramarine Blue, Ultramarine Violet, Ferric Ferrocyanide, and other pigments available from BASF; Malachite Green Oxalate; lamp black; Rose Bengal; Malastral Red; magnetic pigments such as magnetite, ferrites, such as barium ferrite and manganese ferrite, hematite, etc.

The toner particles of this invention may be dispersed in a carrier liquid to form a liquid toner. Any known carrier liquid may be used. Hydrocarbon solvents are preferred. Preferably these hydrocarbon solvents have a resistivity of at least $10^{11}$ ohm-cm and preferably at least $10^{13}$ ohm-cm, a dielectric constant less than 3.5 and a boiling point in the range 140° C. to 220° C. The definition includes aliphatic hydrocarbons and aromatic hydrocarbons. Hydrocarbon solvents that are useful in this invention include higher molecular weight hydrocarbons such as mineral spirits, D-Limonene, kerosene, and those having the trademarks "ISOPAR G", "ISOPAR H", "ISOPAR K", "ISOPAR M", "ISOPAR V", "NORPAR", "EXXSOL D3135", "EXXSOL D40", "EXXSOL D60", "EXXSOL D80", "EXXSOL D110", "EXXSOL D130". The liquid toners of the present invention have conductance values of from 100 to 500 picomho-cm$^{-1}$ for a dispersion containing 2% by weight solids.

The toner particles may be stabilized in the carrier liquid electrostatically or sterically, or both means of stabilization can be used. Electrostatic stabilization involves the incorporation of a charged species, such as $Zr^{4+}$, into the particle, which repels like-charged particles, thereby preventing agglomeration. Steric stabilization involves the use of a solvent-swollen polymeric shell insolubilized at the surface but having soluble polymeric chains extending into the solution. These soluble chains provide for a volume exclusion, thereby preventing the approach of another particle and aggregation of particles in dilute toner solutions.

An advantage of the toner particles of this invention is that they can be prepared directly in a toner carrier liquid. This process comprises steps of:

(1) combining in a hydrocarbon solvent (a) at least one monomer capable of free radical polymerization and (b) at least one macromer that is dispersible in said hydrocarbon solvent to form a mixture, (2) free radically polymerizing the polymerizable components of the mixture formed in step (1) in the presence of a metal cation to form a stable dispersion, and (3) milling the mixture formed in step (2) with pigment particles to disperse the pigment into the polymer.

The liquid toners of this invention are preferably prepared in a concentrated form to conserve storage space and reduce transportation costs. In order to use the toners in the printer, the concentrate is diluted with additional carrier liquid to give what is termed the working strength liquid toner. The toners of this invention are typically prepared as dispersions that contain from about 15 to about 20% by weight solids. The toners of this invention that are actually used in imaging processes can be prepared by diluting the foregoing dispersions to concentrations of from about 1 to about 2% by weight solids.

This invention also provides a method of forming an image comprising the steps of:

a) providing a dielectric medium having at least one region of electrostatic charge (e.g., an imagewise distribution of charge) on the surface thereof, b) intimately contacting the dielectric medium with a liquid toner comprising a hydrocarbon carrier liquid and the inventive toner particles, thereby depositing said toner particles in a pattern corresponding to the surface charge on the dielectric medium, and c) optionally transferring the deposited polymeric toner to a receptor.

Images formed by the present invention may be of a single color or a plurality of colors. Multicolor images can be prepared by repetition of the charging and toner application steps. In multicolor imaging, the toners may be applied to the surface of the image sheet in any order, but for colorimetric reasons, bearing in mind the inversion that occurs on transfer, it is preferred to apply the images down in the following order: black, cyan, magenta, and yellow. Full color reproductions may be made according to the present invention by electrophotographic methods as described by U.S. Pat. Nos. 2,297,691, 2,752,833, 4,403,848, 4,467,334, 2,986,466; 3,690,756; and 4,370,047.

The substrate for receiving the toner image from the imaging surface preferably should be conformable to the microscopic undulations of the imaging surface at the temperature at which transfer takes place. Polymeric materials such as plasticized and compounded polyvinyl chloride (PVC) conform to the imaging surface well, whereas polymeric materials such as polycarbonate do not. Consequently, polycarbonates typically yield poor transfer of the toner image. Other polymeric materials that may be used to form substrates include acrylics, polyurethanes, polyethylene/ acrylic acid copolymer, and polyvinyl butyrals. Commercially available composite materials such as those having the trade designations "SCOTCHCAL" and "PANAFLEX" (both from Minnesota Mining and Manufacturing Co.) are also suitable for preparing substrates. However, some materials such as polyesters and polycarbonates, which appear to be too stiff to give microconformability, can be useful for preparing receptors in the present invention by coating them with a sufficiently thick layer of materials having a suitable $T_g$ and a complex dynamic viscosity below about $2.5 \times 10^5$ poise at a temperature in the range of from about 50° C. to about 150° C. On substrates made of materials such as PVC, the coated layer thickness can be as low as 3 micrometers, whereas on substrates made of "SCOTCHLITE" (from Minnesota Mining and Manufacturing Co.) retroreflective material, a coated layer thickness of 30 micrometers may be required. Other materials suitable for use as substrates, as known to those skilled in the art, may also be used.

The transfer of the formed image from the charged surface to a receiving substrate is enhanced by the incorporation of the surface release-promoting moieties in the toner particles used to form the image. The release-promoting materials can be incorporated into either the core or shell segments of the polymer. The incorporation of a silicone-containing material or a fluorine-containing material in the outer (shell) layer of the particle is preferred to facilitate the efficient transfer of the image.

Overcoating of the transferred image may optionally be carried out to protect the image from physical damage and/or actinic damage. Compositions for overcoatings are well known in the art and typically comprise a clear film-forming polymer dissolved or suspended in a volatile solvent. An ultraviolet light absorbing agent may optionally be added to the coating composition. Lamination of protective layers to the image-bearing surface is also well known in the art and may be used in this invention.

These and other aspects of the present invention are demonstrated in the illustrative examples that follow.

EXAMPLES

The following acronyms are used in the examples.

AAEM: acetoacetoxyethyl methacrylate

TMPS: tris (trimethylsiloxy)-3-methacryloxypropyl silane

IEM: isocyanatoethylmethacrylate.

Materials used in the following examples were available from standard commercial sources such as Aldrich Chemical Co. (Milwaukee, Wis.), unless otherwise specified.

All the liquid toners described in the inventive examples produced image films of sufficient integrity to allow subsequent deposition of toner film images of other colors and to enable subsequent transfer steps.

In the examples, all parts and percentages are by weight, unless indicated otherwise.

a) Synthesis of Macromers

Preparation of Macromer 1

Methacryloxy-terminated poly (lauryl methacrylate-co-acetoacetoxyethyl methacrylate), containing 5.8 mole % of AAEM units, with reactive —CH$_2$ groups of AAEM fully reacted with IEM to form pendant methacryloyl groups [Macromer 1]

A mixture containing lauryl methacrylate (240 g), acetoacetoxyethyl methacrylate (12.5 g), 3m-ercapto-1,2-propanediol (0.432 g), 2,2'-azobisisobutyronitrile (0.328 g), and hydrocarbon solvent ("ISOPAR G") (150 g) was heated for 24 hours in a nitrogen atmosphere at a temperature of 70° C. After a viscous liquid had formed, it was diluted to 50% solids by mixing it with the hydrocarbon solvent "ISOPAR G" (102.5 g). The syrup was then divided into two equal parts.

To one part of the syrup, which contained $2.9 \times 10^{-2}$ moles of AAEM units, a stoichiometric equivalent of isocyanatoethyl methacrylate (4.83 g), followed by dibutyltin dilaurate (0.98 g), were added. The resulting mixture was allowed to react for 48 hours in the dark at ambient temperature.

Preparation of Macromer 2

Poly (lauryl methacrylate-co-AAEM-co-TMPS) containing 5.8 mole % of AAEM units, 1.94 wt % of TMPS and 2-methacryloxy groups [Macromer 2]

The polymerization procedure was similar to that used to prepared Macromer 1, with the following changes:

(1) The monomer mixture consisted of lauryl methacrylate (240 g), acetoacetoxyethyl methacrylate (12.5 g), tris (trimethylsiloxy)-3-methacryloxy propyl silane (5 g), and 3-mercapto 1,2 propanediol (0.432 g).

(2) To one half of the syrup (257.5 g), isocyanatoethyl methacrylate (0.64 g), followed by dibutyltin dilaurate (0.128 g), were added.

The molecular weights of Macromer 2 found by the GPC (polystyrene standard) were as follows: $M_w = 1.36 \times 10^5$; $M_n = 6.4 \times 10^4$.

Preparation of Macromer 3

Methacryloxy terminated poly(lauryl methacrylate-co-acetoacetoxyethyl methacrylate), containing 5.8 mole % AAEM units, with one methacryloxy terminal group per chain. [Macromer 3]

To the second part of the syrup described in the preparation of Macromer 1 was added isocyanatoethyl methacrylate (0.31 g) followed by dibutyltin dilaurate (0.063 g), and the reaction was carried out for 48 hours in the dark at ambient temperature.

Preparation of Macromer 4

Methacryloxy terminated poly(lauryl methacrylate-co-AAEM-co-perfluorooctyl acrylate) [Macromer 4]

A mixture containing lauryl methacrylate (240 g), acetoacetoxyethyl methacrylate (12.5 g), perfluorooctyl acrylate (5 g), and 2,2'-azobisisobutyronitrile (0.328 g) in hydrocarbon solvent "ISOPAR G" (150 g) was polymerized at a temperature 70° C. in the presence of 3-mercapto 1,2 propanediol (0.432 g), which functioned as a chain transfer agent. After 24 hours of polymerization, the syrup was diluted to 50% solids with hydrocarbon solvent "ISOPAR G" (107 g). Isocyanatoethyl methacrylate (1.24 g), followed by dibutyltin dilaurate (0.25 g), were added to the cooled polymer syrup, which was allowed to stand at room temperature for 48 hours.

Preparation of Macromer 5

Methacryloxy terminated poly(lauryl methacrylate-co-AAEM-co-perfluoropolyether acrylate) [Macromer 5]

The procedure described above for the preparation of Macromer 4 was repeated, with the exception that perfluoropolyether acrylate $[C_3F_7O(C_3F_6O)CFCF_3CH_2OCOCH_2CHCH_2]$ was substituted for the perfluorooctyl acrylate.

b) Preparation of Toners

EXAMPLE I

Preparation of Black Toner

Step 1: Preparation of the resin: A mixture of monomers consisting of ethyl acrylate (20 g), ethyl methacrylate (20 g), and butyl methacrylate (10 g) was added. to 700 grams of "ISOPAR G" solvent in a 2-liter flask. Addition was accompanied by mixing. To the resulting mixture, a solution of Macromer 1 (20 g, 50% by weight macromer) was added, along with a charge-directing agent ("ZIRCONIUM HEX-CEM", 4 g, 12% $Zr^4$ content), and the mixture was polymerized at a temperature of 70° C. under nitrogen using 2,2' azobisisobutyronitrile (0.5 g) as an initiator. After polymerization was carried out for about 24 hours, about 100 milliliters of solvent was distilled off under an aspirator vacuum to aid removal of any residual monomers, and the solid content of the remaining latex was determined to be 8.16%.

Step 2: Preparation of the liquid toner: A portion of the latex (260 g) was placed into the cylinder of an Igarashi mill, and carbon black (3.5 g, Regal 300) was added to bring the ratio of resin to pigment to about 6:1. Shearing media (1.3 millimeter Potter glass beads) was added in the required amounts, and the pigment was dispersed in the latex at 2000 rpm for about 100 minutes. This procedure provided a toner concentrate containing about 10% by weight solids.

EXAMPLE II

Preparation of Magenta Toner

A procedure identical to that of Example I was used, with the exception that 4.2 grams of a magenta pigment (4.2 g, "MONASTRAL 796-D", Sun Chemical Co.) was used instead of Regal 300 carbon black (3.5 g). This procedure provided a magenta-colored toner having a ration of resin to pigment of about 5:1.

EXAMPLE III

Preparation of Black Toner Having Silicon Moieties in the Core

A procedure identical to that of Example I was used, with the exception that TMPS (2.4 g) was added to the mixture of monomers prior to polymerization. This procedure provided a black toner resulted that contained release-enhancing silicon moieties in the core of the particles.

EXAMPLE IV

Preparation of Black Toner Having Silicon Moieties in the Shell

A procedure identical to that of Example I was used, with the exception that Macromer 2 was substituted for Macromer 1. This procedure provided a black toner that contained release-enhancing silicon moieties in the shell of the particles.

EXAMPLE V

Preparation of Black Toner Having Fluorine Moieties in the Shell

A procedure identical to that of Example I was used, with the exceptions that Macromer 4 was substituted for Macromer 1 and the amounts of monomers ethyl acrylate, ethyl methacrylate, and butyl methacrylate used were 16.3 grams each. This procedure provided a black toner that contained release-enhancing fluorine moieties in the shell of the particles.

EXAMPLE VI

Preparation of Black Toner Having Fluorine Moieties in the Shell

A procedure identical to that of Example V was used, with the exceptions that Macromer 5 was used in place of Macromer 4.

EXAMPLE VII

Comparison of Transfer Efficiency

The imaging was performed on a positive corona charged photoreceptor drum coated with a silicone release layer, by exposure to a laser from an image scanner to generate an image pattern. The latent image was developed on the drum rotating at the surface speed of 4 inches/sec. The image after drying was transferred under the required pressure and temperature to a fluorosilicone elastomer (Dow Corning 94003), and then from the elastomer surface to a plain paper under heat and pressure.

The black toner of Example I (contains no release moieties in either core or shell) was transferred first to an intermediate elastomer layer. In order to achieve good transfer, the surface temperature of the intermediate elastomer layer had to be about 100° C. and considerable pressure in excess of standard operating pressures had to be applied.

Upon incorporation of silicone moieties into the core of the toner (Example III), the image transfer from the photoreceptor to the elastomer becomes marginally acceptable at only 80° C. and standard operating conditions. Transfer of the image from the elastomer to the plain paper requires temperatures of greater than 90° C. but no unusual pressure is required.

Upon incorporation of silicone moieties into the shell (Example IV) good transfer from the photoreceptor to the elastomer occurs at temperatures slightly above 80° C. The transfer from the intermediate elastomer layer to the plain paper was good at 80° C. and excellent at 90° C. The image transfer resulting from the composition in Example IV which exhibits complete transfer of the image without leaving any residue on the photoreceptor, is an improvement over the image transfer resulting from the composition in Example I.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A polymer comprising:
   A) a segment formed from ethylenically unsaturated monomers by free radical polymerization,
   B) macromeric moieties grafted to said segment wherein the moieties render the polymer dispersible in hydrocarbon solvents,
   C) surface release promoting moieties derived from a free radically polymerizable monomer comprising silicon or fluorine atoms.

2. The polymer of claim 1 further comprising charge directing chelating moieties.

3. The polymer of claim 1 wherein the macromeric moieties are derived from the reaction of
   at least one free radically polymerizable monomer selected from the group consisting of lauryl methacrylate, lauryl acrylate, iso-bornyl methacrylate, iso-bornyl acrylate, iso-octyl methacrylate, iso-octyl acrylate, iso-decyl acrylate, iso-decyl methacrylate, n-decyl acrylate, n-decyl methacrylate, n-octodecyl acrylate, and n-octodecyl methacrylate,
   a chain transfer agent selected from the group consisting of mercaptoalcohols, bromoalcohols, mercaptocarboxylic acids, and halogenated aliphatic carboxylic acids,
   a free radical generating initiator, and
   a coupling agent.

4. The polymer of claim 1 wherein the surface-release promoting moieties are grafted to the macromeric moieties.

5. The polymer of claim 2 wherein the charge directing chelating moieties are grafted to the macromeric moieties.

6. The polymer of claim 1 wherein the surface release promoting moiety comprises at least two silicon atoms.

7. The polymer of claim 6 wherein said surface release-promoting moiety is derived from a monomer selected from the group consisting of 3-methacryloxypropyltris(trimethylsiloxy)silane, 3-acryloxypropyltris(trimethylsiloxy)silane, vinyltris(trimethylsiloxy)silane, tris[tris(trimethylsiloxy)siloxylvinylsilane.

8. The polymer of claim 1, wherein said surface release-promoting moiety comprises at least two fluorine atoms.

9. The polymer of claim 8, wherein said surface release-promoting moiety is derived from a monomer selected from the group consisting of perfluorooctyl acrylate, perfluorooctyl methacrylate, and perfluorooctyl ether acrylate.

* * * * *